US011235415B2

(12) United States Patent
Kodama et al.

(10) Patent No.: US 11,235,415 B2
(45) Date of Patent: Feb. 1, 2022

(54) FILLET WELDED JOINT AND METHOD OF MANUFACTURING THEREOF (71) Applicant: NIPPON STEEL CORPORATION, Tokyo (JP)

(72) Inventors: Shinji Kodama, Tokyo (JP); Kazuki Matsuda, Tokyo (JP); Yoshinari Ishida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 146 days.

(21) Appl. No.: 16/489,144

(22) PCT Filed: Feb. 28, 2018

(86) PCT No.: PCT/JP2018/007638
§ 371 (c)(1),
(2) Date: Aug. 27, 2019

(87) PCT Pub. No.: WO2018/159719
PCT Pub. Date: Sep. 7, 2018

(65) Prior Publication Data
US 2019/0388995 A1 Dec. 26, 2019

(30) Foreign Application Priority Data
Feb. 28, 2017 (JP) .............................. JP2017-036283

(51) Int. Cl.
B32B 15/00 (2006.01)
B23K 9/23 (2006.01)
(Continued)

(52) U.S. Cl.
CPC ................. B23K 9/23 (2013.01); B23K 9/02 (2013.01); B23K 35/30 (2013.01); C22C 38/06 (2013.01);
(Continued)

(58) Field of Classification Search
None
See application file for complete search history.

(56) References Cited

U.S. PATENT DOCUMENTS

2010/0074792 A1* 3/2010 Murakami ............... C21D 9/46
420/38
2012/0129006 A1* 5/2012 Kanai ..................... C22C 38/00
428/683
(Continued)

FOREIGN PATENT DOCUMENTS

JP 10-1742 A 1/1998
JP 11-104838 A 4/1999
(Continued)

OTHER PUBLICATIONS

International Preliminary Report on Patentability and Written Opinion of the International Searching Authority (Forms PCT/IB/326, POT/IB/373 and PCT/ISA/237) for International Application No. POT/JP2018/007638, dated Sep. 12, 2019, with English translation of the Written Opinion.
International Search Report for International Application No. PCT/JP2018/007638, dated May 22, 2018, with English translation.

Primary Examiner — Seth Dumbris
(74) Attorney, Agent, or Firm — Birch, Stewart, Kolasch & Birch, LLP (57) ABSTRACT In a fillet welded joint a base material tensile strength is 980 MPa or more, a carbon equivalent is 0.36 or more and 0.60 or less, a tensile strength [MPa] is 1950 times or more of the carbon equivalent [wt %], a weld metal average carbon equivalent is 0.45 or more and 0.65 or less, and at a prescribed position below a surface of a weld toe, a Vickers hardness HVbond at a boundary between the weld metal and a heat affected zone, an average value HVwmt of the Vickers hardness of the weld metal in a position 0.1-mm or more and 0.3-mm or less to the weld metal side of the boundary, and an average value HVhaz of the Vickers hardness of the heat
(Continued)

Position of point on imaginary line in FIG. 1 affected zone in a position 0.1-mm or more and 0.3-mm or less to the heat affected zone side of the boundary satisfy HVbond≤HVwmt, HVbond≥HVhaz-50, and HVhaz≤350.

20 Claims, 3 Drawing Sheets

(51) Int. Cl.
  *B23K 9/02* (2006.01)
  *B23K 35/30* (2006.01)
  *C22C 38/06* (2006.01)
  *C22C 38/58* (2006.01)
(52) U.S. Cl.
  CPC ....... *C22C 38/58* (2013.01); *Y10T 428/12347* (2015.01)

(56) References Cited

U.S. PATENT DOCUMENTS

| | | | |
|---|---|---|---|
| 2015/0174702 A1* | 6/2015 | Fujimoto | B23K 26/244 428/594 |
| 2015/0196967 A1* | 7/2015 | Tsuchiya | B23K 9/025 403/272 |
| 2015/0217396 A1* | 8/2015 | Okada | B23K 11/11 403/271 |
| 2018/0207751 A1* | 7/2018 | Kodama | C22C 38/06 |

FOREIGN PATENT DOCUMENTS

| | | |
|---|---|---|
| JP | 2007-253160 A | 10/2007 |
| JP | 2010-214466 A | 9/2010 |
| WO | WO 2011/037272 A4 | 3/2011 |
| WO | WO 2017/018492 A1 | 2/2017 |

* cited by examiner

FILLET WELDED JOINT AND METHOD OF MANUFACTURING THEREOF

FIELD

The present invention relates to a fillet welded joint and a method of manufacturing thereof, and more particularly to a fillet welding technique in which weld fatigue strength of the fillet welded joint is improved while suppressing low temperature cracking.

BACKGROUND

In recent years, the use of thin high-strength steel plates is expected for the purpose of reducing the weight of a vehicle body, in particular a chassis. In the chassis member, from the viewpoint of durability of the member, its fatigue strength is emphasized. In general, when steel plates are welded to each other, the welded portion becomes a stress concentrated portion, which causes the reduction of the fatigue strength of the member. Furthermore, in the case of applying a thin high strength steel plate, it is necessary to increase fatigue strength of the welded portion according to the increase in the strength of the steel plate. However, when a high strength steel plate is used as a base material, a hardness of the heat-affected zone (HAZ) of the base material tends to be higher than that of the weld metal, and the fatigue strength of the welded portion may be lowered due to their difference in the hardness. For this reason, in order to apply the thin high strength steel plate for the vehicle body as the chassis, it is necessary to increase the weld fatigue strength of the high strength steel plate.

Specifically, when the tensile strength of the steel plate exceeds 780 MPa, the fatigue strength of the welded portion tends to be significantly reduced. For this reason, development of a technique which improves the fatigue strength of the welded portion in the case of using a high strength steel plate whose tensile strength is 980 Mpa or more is especially desired.

The following techniques are known as techniques for improving the fatigue strength of the welded portions.

PRIOR ART LITERATURE

Patent Documents

Patent Document 1: Japanese Patent Publication (Kokai) No. 11-104838
Patent Document 2: International Publication WO 2017/018492
Patent Document 3: International Publication WO 2011/037272

Patent Document 1 discloses a structural steel welded joint. This joint has an average value A of Vickers hardness measured according to JIS Z 2244 in the range of 1 mm from the molten boundary to the welding metal side at a position within 0.5 mm below the surface of the weld toe, and the maximum hardness value B similarly measured in the range of 1 mm from the molten boundary to the side of the welding heat affected zone coarse grain area of the base material characterized in that the difference of (A-B) is 26 or more and 39 or less. It is said that such a characteristic can stably provide a welded joint with improved fatigue strength.

Patent Document 2 discloses a fillet arc welded joint. This joint is characterized in that a remelted portion by laser irradiation is formed to a predetermined depth in a region including a weld toe and the boundary of the heat-affected zone of fillet arc welding. Such characteristics are said to locally quench harden the welded portion and suppress the development of cracks in the welded portion.

Patent Document 3 discloses a fillet arc welded joint. This joint is characterized in that, in the steel plate and the welding wire, the amount of Si is particularly limited. With such characteristics, it is said that the shape of the weld toe becomes good even at a welding speed of more than 80 cm/min, particularly more than 110 cm/min and no more than 150 cm/min, and thus the fatigue characteristics of the fillet arc welded joint can be improved.

SUMMARY

Problems to be Solved by the Invention

In the technique disclosed in Patent Document 1, in order to improve the fatigue strength of the welded portion, the hardness of the weld metal is made higher than the hardness of the toe portion and the heat affected zone. Generally, the higher the base material strength, the higher the hardenability of the steel component, so the hardness of the heat-affected zone, which was originally a steel plate itself, also increases. For this reason, in the case of using a high strength steel plate having a tensile strength of 980 MPa or more, it is necessary to use a high strength welding wire which becomes a main component of the weld metal.

However, if the welding wire strength is excessively increased, the weld metal may be hardened and low temperature cracking may occur in the weld metal. The cause of low temperature cracking is hydrogen embrittlement, which can be effectively suppressed by reducing diffusible hydrogen that has penetrated into the weld metal during welding, reducing tensile residual stress caused by shrinkage of the weld metal, and lowering the hardness of the weld metal. However, under general welding conditions, it is difficult to reduce the amount of diffusible hydrogen or the residual tensile stress, and preventing excessive hardening of the weld metal is a measure for preventing hydrogen embrittlement.

Further, in order to manufacture a welded joint using a thin steel plate as a base material, welding is performed at a high speed, and thus there is a possibility that the welding wire component and the base material component may not be uniformly mixed when the weld metal solidifies. For this reason, in the vicinity of the toe portion, there will be a region of a mixture in which the base material component having a relatively low alloy component concentration is present more than the welding wire having a relatively high alloy component concentration. As a result, in this region, a sufficient weld metal hardness may not be obtained.

Accordingly, when a high strength thin steel plate having a tensile strength of 980 MPa or more is used as a base material in joint welding, there is a problem that the hardness of the weld metal in the vicinity of the toe portion cannot be sufficiently enhanced due to the limitation by the low temperature cracking of the weld metal. As a result, strain associated with loading may be concentrated in the boundary region between the heat-affected zone and the weld metal, cracking may occur in the boundary region, and thus excellent fatigue strength of the welded portion may not be obtained.

Incidentally, in the technique disclosed in Patent Document 2, a remelted portion by laser irradiation is formed to a predetermined depth in a region including the weld toe and the boundary of the heat affected zone. Such laser irradiation is performed in an additional manner after the welding operation, and there is a possibility that equipment investment and work load therefor may increase. Moreover, in Patent Document 2, there is no description or suggestion regarding low temperature cracking.

In the technique disclosed in Patent Document 3, by limiting the amount of Si of the steel plate and the welding wire, in particular, the shape of the weld toe is improved so that the fatigue characteristics of the fillet arc welded joint is enhanced. However, Patent Document 3 hardly describes or suggests low temperature cracking. Specifically, Patent Document 3 only describes that no slit is provided because there is a risk of intrusion of external air (hydrogen) if the welding wire has a slit.

The present invention has been made in view of the above circumstances, and the goal of the present invention is to provide a fillet welded joint having excellent welding fatigue strength while suppressing low temperature cracking in a steel plate having a tensile strength of 980 MPa or more, and a method of manufacturing the same.

Means For Solving the Problems

The present inventors diligently studied a fillet welded joint which can realize excellent weld fatigue strength while suppressing low temperature cracking. As a result, the following findings were made. For a base material having a predetermined tensile strength, a high strength steel plate suitably selected from one having the value of carbon equivalent and the relationship between carbon equivalent [wt %] and tensile strength [MPa] is used. In addition, using a welding wire having an appropriate carbon equivalent, a preferred relationship among the Vickers hardness HVbond at the boundary region between the weld metal and the heat-affected zone, the average Vickers hardness HVwmt of the weld metal, and the average Vickers hardness HVhaz of the heat-affected zone can be satisfied, and thus it is possible to obtain a fillet welded joint that achieves excellent weld fatigue strength while suppressing low temperature cracking. The present invention has been made based on such findings, and the summary thereof is as follows.

(1) A fillet welded joint obtained by overlapping a part of two sheets of base material and performing fillet welding, wherein the fillet welded joint comprises the base material, weld metal and heat-affected zone, wherein the base material has a tensile strength of 980 MPa or more, a carbon equivalent of 0.36 or more and 0.60 or less, and the tensile strength [MPa] of 1950 times or more of the carbon equivalent [wt %] of the base material, wherein the weld metal has an average carbon equivalent of 0.45 or more and 0.65 or less, and higher carbon equivalent of the base material, wherein, in a cross section perpendicular to the welding line of the fillet welded joint, on a straight line parallel to the surface of the base material, passing a position of 0.1 mm or more and 0.3 mm or less from the weld toe in the plate thickness direction of the base material, a Vickers hardness HVbond at a boundary between the weld metal and the heat affected zone, an average value HVwmt of the Vickers hardness of the weld metal in a position of 0.1 mm or more and 0.3 mm or less from the boundary to the weld metal side, and an average value HVhaz of the Vickers hardness of the heat affected zone in a position of 0.1 mm or more and 0.3 mm or less from the boundary to the heat affected zone side satisfy the following relationship.

$$HVbond \leq HVwmt \quad (1)$$

$$HVbond \geq HVhaz - 50 \text{ and} \quad (2)$$

$$HVhaz \leq 350 \quad (3)$$

(2) The fillet welded joint according to item (1) as described above, wherein the tensile strength [MPa] of the base material is 2750 times or less of the carbon equivalent [wt %] of the base material.

(3) The fillet welded joint according to item (1) or (2) as described above, wherein the base material comprises $0.01 \leq C \leq 0.25$, $0.01 \leq Si \leq 2.00$, $0.05 \leq Mn \leq 3.0$, and $0.001 \leq Al \leq 0.4$ on the basis of mass %, the balance being Fe and unavoidable impurities.

(4) The fillet welded joint according to item (3) as described above, wherein the base material further comprises at least one of $0.1 \leq Ni \leq 3.0$, $0.1 \leq Cr \leq 2.0$, $0.005 \leq Mo \leq 0.05$, $0.005 \leq Nb \leq 0.3$, $0.005 \leq V \leq 0.3$, $0.005 \leq Ti \leq 0.3$, and $0.0001 \leq B \leq 0.01$ on the basis of mass %.

(5) The fillet welded joint according to any one of items (1) to (4) as described above, wherein the weld metal comprises $0.03 \leq C \leq 0.25$, $0.01 \leq Si \leq 2.00$, $0.5 \leq Mn \leq 3.0$, and $0.001 \leq Al \leq 0.15$ on the basis of mass %, the balance being Fe and unavoidable impurities.

(6) The fillet welded joint according to item (5) as described above, wherein the weld metal further comprises at least one of $0.1 \leq Ni \leq 3.0$, $0.1 \leq Cr \leq 2.0$, $0.005 \leq Mo \leq 0.5$, $0.005 \leq Nb \leq 0.1$, $0.005 \leq V \leq 0.15$, $0.005 \leq Ti \leq 0.15$, and $0.0001 \leq B \leq 0.01$ on the basis of mass %.

(7) The fillet welded joint according to any one of items (1) to (6) as described above, wherein the base material has plate thickness of 1.0 mm or more and 3.6 mm or less.

(8) The fillet welded joint according to any one of items (1) to (7) as described above, wherein in a cross section perpendicular to the welding line of the fillet welded joint, on a straight line parallel to the surface of the base material, passing a position of 0.1 mm or more and 0.3 mm or less from the weld root point in the plate thickness direction of the base material, an average value HVwmr of the Vickers hardness of the weld metal in the region of 0.1 mm or more and 0.3 mm or less from the boundary between the weld metal and the heat affected zone located below the weld root point to the weld metal side satisfies the following relationship:

HVwmr≤350.

(9) A method of preparing a fillet welded joint comprising overlapping a part of two sheets of base material and performing fillet welding by using a welding wire, wherein the base material has a tensile strength of 980 MPa or more, a carbon equivalent of 0.36 or more and 0.60 or less, and the tensile strength [MPa] of 1950 times or more of the carbon equivalent [wt %] of the base material, wherein the welding wire has a carbon equivalent of 0.50 or more and 0.80 or less, and higher carbon equivalent of the base material, wherein the welding speed is 60 cm/min or more and 150 cm/min or less.

Effect of the Invention

In the present invention, for the base material having a predetermined tensile strength, a high-strength steel plate in which the value of carbon equivalent and the relationship between the carbon equivalent and the tensile strength are suitably selected is used. In addition, a high strength welding wire having an appropriate carbon equivalent is used. Therefore, according to the present invention, each of Vickers hardness at the boundary region between the weld metal and the heat affected zone, in the weld metal and in the heat affected zone can be suitably controlled, and consequently it is possible to realize excellent welding fatigue strength while suppressing the low temperature cracking of the fillet welded joint.

EMBODIMENTS FOR CARRYING OUT THE INVENTION

<Fillet Welded Joint>

The present inventors repeatedly conducted intensive studies to improve the fatigue strength of the welded portions (including the weld metal and the heat-affected zone) while suppressing low temperature cracking of the weld metal in fillet welding of high strength thin steel plates. As a result, the present inventors have made the following findings. On the premise that a thin steel material having a tensile strength of 980 MPa or more is used as the base material, a high strength steel plate in which the value of the carbon equivalent of the base material and the relationship between the carbon equivalent and the tensile strength are suitably selected is used. In addition, a high strength welding wire having an appropriate carbon equivalent is used. As a result, the fatigue strength of the welded portion near the toe portion is enhanced, and hydrogen embrittlement of the weld metal which may be a cause of low temperature cracking can be prevented. The fillet welded joint of the present embodiment is based on the above-described findings.

Incidentally, according to JIS Z 3001 (welding terms), the heat affected zone means the non-melted portion of the base material whose structure, metallurgical properties, mechanical properties, etc. have changed due to heat such as by welding or cutting.

The fillet welded joint of the present embodiment is a joint obtained by overlapping a part of two sheets of high strength thin steel plate (base material) and performing fillet welding. Specifically, it is a concept including a lap joint and a T joint.

In addition, the fillet welded joint of the present embodiment is directed to a joint having a so-called high strength steel plate having a tensile strength of 980 MPa or more as a base material. However, when the tensile strength of the base material exceeds 1470 MPa, the improvement of the fatigue strength of the welded portion of the joint of the present embodiment described later cannot be sufficiently obtained. For this reason, the tensile strength of the base material is preferably 1470 MPa or less.

Under such conditions, in the fillet welded joint of the present embodiment, the carbon equivalent of the base material is 0.36 or more and 0.60 or less. By setting the carbon equivalent of the base material to 0.36 or more, the base material itself can be hardened, and a strength that can be sufficiently applied as a member of a vehicle body, particularly a chassis, can be obtained.

On the other hand, by setting the carbon equivalent of the base material to 0.60 or less, the hardness of the heat-affected zone is not excessively increased, which will suppress the difference between the hardness at the boundary area between the heat-affected zone and the weld metal, and the hardness of the affected zone in the vicinity of the boundary area, and thus it is possible to efficiently prevent the occurrence of cracks in the vicinity of the boundary area. Here, the boundary between the heat affected zone and the weld metal can be determined by cutting the welded portion in the direction perpendicular to the welding line and corroding its cross section.

By setting the carbon equivalent of the base material to 0.40 or more and 0.55 or less, the above respective effects can be achieved at even higher level.

Here, the carbon equivalent [wt %] of the base material, the weld metal, and the welding wire is represented by the following formula.

Carbon equivalent [wt %]=C+Si/24+Mn/6+Ni/40+Cr/5+Mo/4+V/14 wherein C, Mn, Ni, Cr, Mo, and V in the formula are content rates [wt %] in each material. Incidentally, the content rate of the elements is measured in the part of the base material which does not contain a plating part, and/or the part of the welding wire which does not contain a plating part.

Furthermore, in the fillet welded joint of the present embodiment, the tensile strength [MPa] of the base material is 1950 times or more of the carbon equivalent [wt %] of the base material. By satisfying this requirement, the structure of the base material becomes a martensite-based structure. The structure of the base material is governed by the hot rolling conditions during base material production, but in particular, in order to secure a predetermined base material strength, it is important that the cooling rate at the time of hot rolling is increased to form a martensitic structure, along with utilizing work hardening by rolling.

However, when welding is performed using a high strength steel plate manufactured in such a rolling mode, the heat affected zone (HAZ) may be tempered and softened. Therefore, it is preferable to set the tensile strength [MPa] of the base material to 2750 times or less of the carbon equivalent [wt %] of the base material. Accordingly, it is possible to suppress the decrease in static strength of the joint with respect to the strength of the base material, that is, the decrease in strength due to HAZ softening. The ratio of the tensile strength of the joint (the tensile strength of the joint/the tensile strength of the base material) is preferably 0.7 or more based on the tensile strength of the base material.

Figure 1:
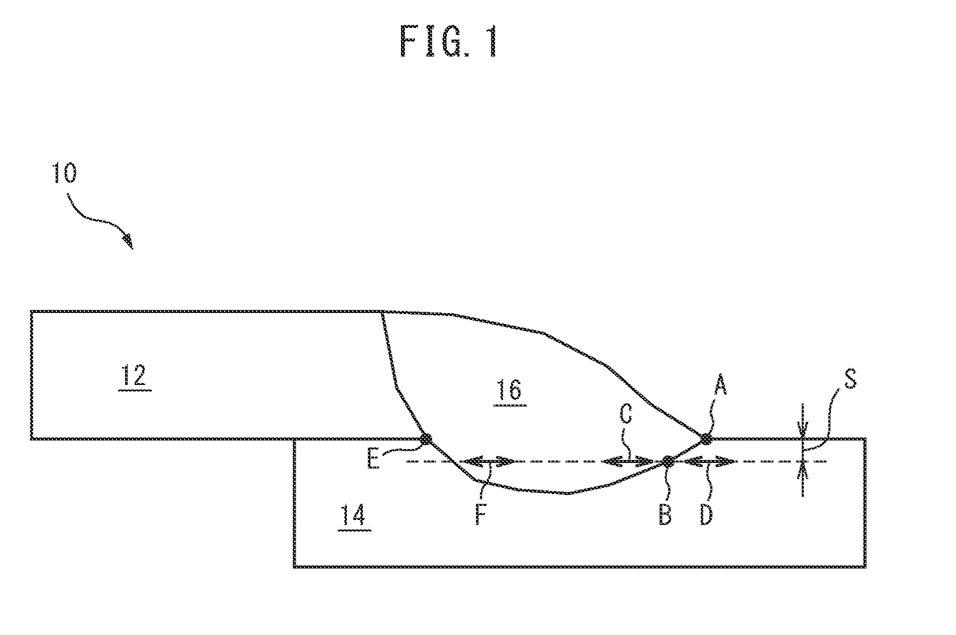
FIG. 1 is a cross-sectional view showing a fillet welded joint of the present embodiment obtained by overlapping a part of two sheets of base material and performing fillet welding.

FIG. 1 is a cross-sectional view showing a fillet welded joint of the present embodiment obtained by overlapping a part of two sheets of base material and performing fillet welding. The cross section is a cross section perpendicular to the welding line of the fillet welded joint. The fillet welded joint 10 of the present embodiment includes two sheets of base material 12 and 14, a weld metal 16, and a heat affected zone (not shown). In FIG. 1, point A is a so-called weld toe, and the dotted line is an imaginary line showing a straight line parallel to the surface of the base material, passing the position of S mm (0.1 mm or more and 0.3 mm or less) in the plate thickness direction of the base material from the weld toe A.

With respect to the fillet welded joint having the above configuration, a point or a region on this imaginary line will be considered.

Representative point B at the boundary between the weld metal 16 and the heat affected zone (HAZ) (of the base material 14), An average value HVwmt of Vickers hardness of the weld metal in region C of 0.1 mm or more and 0.3 mm or less from representative point B to the weld metal 16 side, and An average value HVhaz of Vickers hardness of the heat-affected zone in region D of from 0.1 mm or more and 0.3 mm or less from representative point B to the heat-affected zone side.

Incidentally, each of the average value HVwmt of Vickers hardness, and the average value HVhaz of Vickers hardness is an average value of hardness in at least arbitrary three points in regions C and D, respectively.

Here, a cross section corroded by picric acid was used as an observation surface of the boundary area. When corroded by picric acid, it is possible to confirm the solidified form in the growth direction of the dendrite, for example, and therefore, it is possible to clearly distinguish the melt-consolidated weld metal zone with the heat affected zone which is a transformation structure. Further, representative point B means a point determined as a boundary between the weld metal having a dendritic structure and the heat-affected zone having no such a structure.

Under such premise, the fillet welded joint of the present embodiment has Vickers hardness HVbond at representative point B, an average value HVwmt of Vickers hardness of the weld metal in region C, and an average value HVhaz of Vickers hardness of the heat affected zone in region D which satisfy the following relationships (a) to (c).

(A) HVbond≤HVwmt
(B) HVbond≤HVhaz−50 and
(C) HVhaz≤350.

Figure 2:
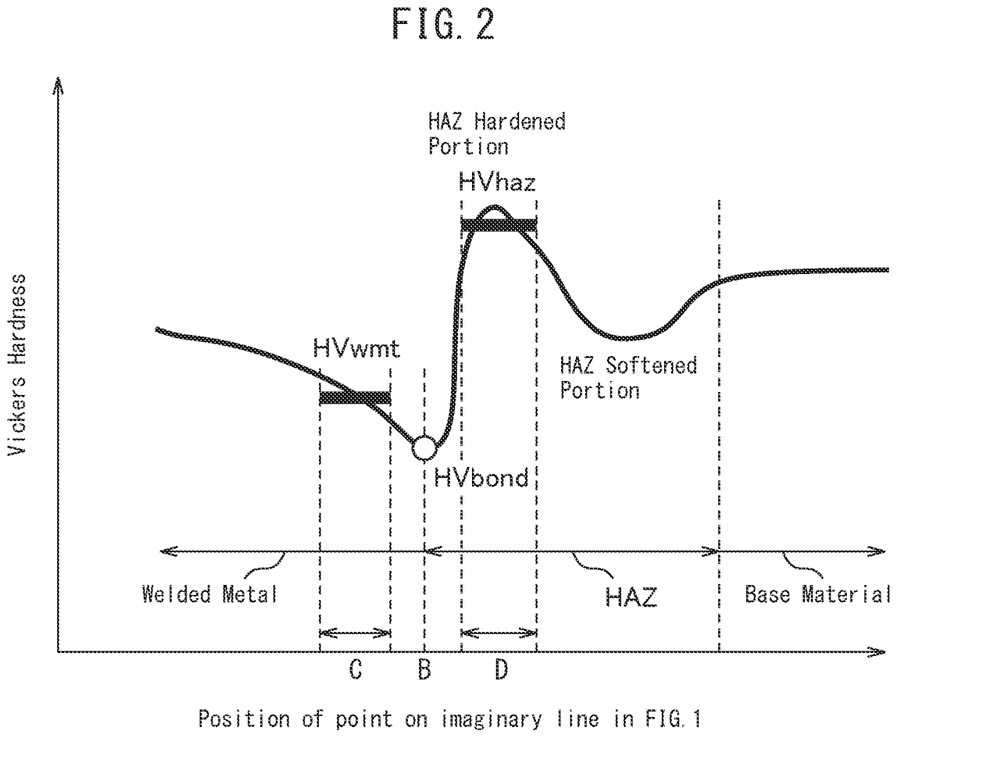
FIG. 2 is a graph showing the relationship between Vickers hardness and a point on an imaginary line for the fillet welded joint shown in FIG. 1.

FIG. 2 is a graph showing the relationship between the Vickers hardness and the region on the imaginary line for the fillet welded joint shown in FIG. 1. Incidentally, the Vickers hardness shown in the figure is not a quantitative value but a qualitative value. Hereinafter, the relationships (a) to (c) will be described in detail.

(A) HVbond≤HVwmt

This requirement is an index that means that the weld metal is hardened relative to the molten boundary area. This requirement is influenced by a component of the welding wire and a high speed welding which is characteristic of thin steel plate welding. In the high-speed welding, mixing of the base material component and the welding wire component becomes uneven, and in particular, the mixing ratio of the base material component becomes high in the weld metal in the vicinity of the boundary between the weld metal and the heat affected zone (region C). In addition, when the base material component is melted by the welding heat, the alloying elements are oxidized and consumed by the influence of the oxidizing gas in the atmosphere and the oxide inclusions in the weld metal promote the ferrite transformation. As a result, the hardness of the weld metal in the vicinity of the molten boundary (region C) is lowered. Therefore, in order to prevent fatigue cracking due to strain concentration in the softened weld metal in the vicinity of the molten boundary (region C), it is necessary to set the lower limit of the carbon equivalent of the welding wire (as 0.5 or more, which is higher than the carbon equivalent of the base metal), so that HVbond≤HVwmt.

(B) HVbond≤HVhaz−50

Conventionally, the biggest reason why the fatigue strength of the welded portion (including the weld metal and the heat-affected zone) is not sufficiently exhibited in the fillet welded joint is because the difference between the value of the Vickers hardness at point B and (the average value of) the Vickers hardness in region D in FIG. 2 is excessively large which leads to the fatigue failure from the vicinity of toe portion A. The cause of the fatigue failure is as follows. A smooth solidified interface is formed at the boundary (representative point B) between the weld metal and the heat-affected zone of the base material, and the alloying element of the steel component is discharged to the molten metal side to make the hardness relatively low. On the other hand, in the heat-affected zone (region D), the hardness becomes relatively high by martensitic transformation due to cooling after welding.

This requirement is an index that means it can be made the difference in hardness at point B and region D significantly smaller as compared with the conventional case by suitably selecting the relationship between the tensile strength and the carbon equivalent of the base material, in addition to the tensile strength of the base material. Specifically, by setting the carbon equivalent of the base material to 0.36 or more and increasing the cooling rate at the time of producing the hot rolled steel plate, the martensitic transformation of the base material is promoted. At the same time, on the premise that work hardening is used to make the tensile strength of the base material 980 MPa or more, the carbon equivalent of the base material is set to 0.60 or less to suppress the hardening of HVhaz. As a result, the hardening in the welding heat affected zone in the vicinity of the molten boundary may be suppressed. This technique reduces a degree of hardening due to cooling of the heat-affected zone at the time of welding, as compared to hardening due to cooling and processing in the manufacture of the steel plate base material, thereby suppressing the hardening of the heat-affected zone while securing the strength of the base material. This is a technology different from a conventional concept. On the other hand, for suppressing the softening of the HVbond, the lower limit of the carbon equivalent of the welding wire is specified (as 0.5 or more, which is higher than the carbon equivalent of the base metal) to prevent the softening of the weld metal and not to increase the difference in hardness between the weld metal and the heat-affected zone.

(C) HVhaz≤350

This requirement defines the upper limit of the hardness of the heat-affected zone in the vicinity of molten boundary, and is an index for preventing excessive hardening of the heat-affected zone and, consequently, a decrease in the fatigue strength of the welded portion. By setting the carbon equivalent of the base material to 0.60 or more, hardening in the welded heat-affected zone in the vicinity of the molten boundary can be suppressed.

In combination of the relationships (a) to (c) shown above, in the fillet welded joint of the present embodiment, excellent fatigue strength of the welded portion (including the weld metal and the heat affected zone) can be realized.

The fatigue strength is measured by the following test.

Figure 3:
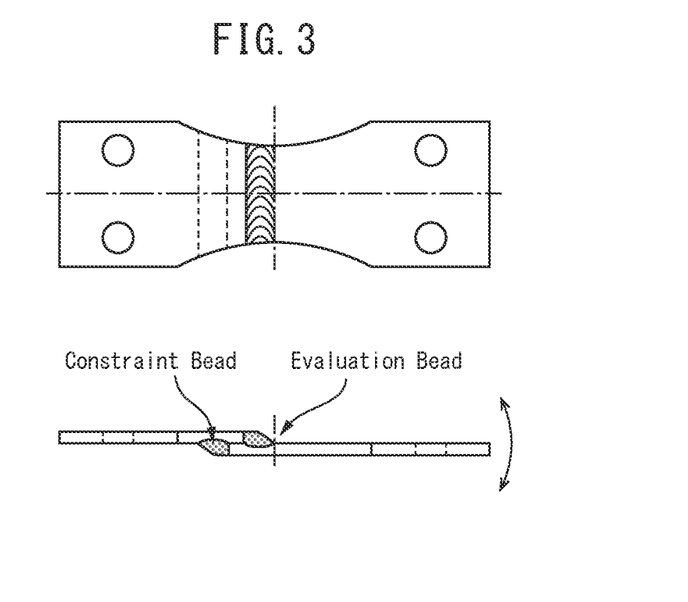
FIG. 3 is a view for explaining a fatigue bending test.

As a fatigue test piece, a plane bending fatigue test piece having a shape shown in FIG. 3 is prepared, and the fatigue strength of the weld toe portion is evaluated. In order to obtain the fatigue strength of the weld toe portion in a double-bending test, after conducting the overlapped fillet welding for evaluation, the back side was constrained by welding to prevent opening of the root portion. The fatigue test was a bending fatigue test for displacement control (stress ratio R=−1), the repetition frequency was 25 Hz, the test termination condition was a 40% reduction in torque, or at the time when the number of repetitions reached $2\times10^6$ times without a reduction in torque.

Fatigue strength may be assessed on a relative basis. Based on the fatigue strength of the conventional fillet welded joint, the higher the fatigue strength ratio, the better the fatigue strength. The fatigue strength ratio to the conventional product is preferably as high as possible, and may be 1.1 or more. More preferably, the fatigue strength ratio may be 1.2 or more. More preferably, the fatigue strength ratio may be 1.3 or more. The fatigue strength of a fillet welded joint obtained by fillet welding a 780 MPa steel may be used as the fatigue strength of a conventional fillet welded joint serving as a reference, without considering the carbon equivalent specified in the present invention.

In addition, in the fillet welded joint of the present embodiment, the average carbon equivalent of the weld metal is 0.45 or more and 0.65 or less, which is higher than the carbon equivalent of the base material. According to this requirement, softening the weld metal can be prevented by setting the average carbon equivalent of the weld metal to 0.45 or more, which is higher than the carbon equivalent of the base material, and the fatigue strength of the welded portion (including the weld metal and the heat-affected zone) can be further improved. On the other hand, by setting the average carbon equivalent of the weld metal to 0.65 or less, excessive hardening of the weld metal can be suppressed, and hydrogen embrittlement of the weld metal can be prevented. Moreover, when the range of such a carbon equivalent is 0.50 or more and 0.60 or less, the above effects are preferably achieved at a high level, respectively. The average carbon equivalent in the weld metal is an average of the carbon equivalent in at least arbitrary three points in the weld metal portion.

In the fillet welded joint having such a configuration, the base material and/or the weld metal can be selected from the following components (all in mass %).

First, the components of the base material will be described. Incidentally, the value of each component in the base material is measured using the main part of the base material, which does not contain a plating part.

C: 0.01% or More and 0.25% or Less

C is preferably present in an amount of 0.01% or more in order to secure the strength of the joint. Further, in order to make the hardness distribution in the vicinity of the weld toe uniform, it is preferable to set it to 0.25% or less.

Si: 0.01% or More and 2.00% or Less

Si is useful for deoxidation and for securing strength, and is preferably in an amount of 0.01% or more. In addition, the addition of more than 2.00% impairs the weldability, so the content is preferably 2.00% or less.

Mn: 0.05% or More and 3.0% or Less

Mn is useful as an element to increase the strength at a low cost, and is preferably in an amount of 0.05% or more in order to secure the strength. In addition, the addition of more than 3.0% impairs the weldability, so the content is preferably 3.0% or less.

Al: 0.001% or More and 0.4% or Less

It is preferable to make the amount of Al 0.001% or more for deoxidation. In addition, when the content is more than 0.4%, inclusions in the steel and the weld metal become too much and the toughness is reduced. Therefore, the content is preferably 0.4% or less.

Balance: Fe and Impurities

The balance is Fe and impurities. Here, the term "impurity" refers to a component contained in the raw material or a component incorporated in the process of production and not a component intentionally contained in the base material. The impurities include P and S. Moreover, since plating may be performed on the surface of the base material, plating components such as Zn and Al may be incorporated in the base material as an unavoidable component by about 0.10 to 0.3%. It is preferable to analyze the components of the base material in consideration of the thickness of the plating or the like so as not to be affected by plating or the like.

Optional Elements: Ni, Cr, Mo, Nb, V, Ti and B

Ni, Cr, Mo, Nb, V, Ti, and B are all components that improve joint fatigue characteristics, and are considered to improve the fatigue strength against a force affected by the weld metal and the heat affected zone (HAZ). In this respect, these components are active components, and the fillet welded joint of the present embodiment can contain at least one of these components. However, any excess addition degrades the steel plate material. Therefore, it is preferable to contain in the range of $0.1 \leq Ni \leq 3.0$, $0.1 \leq Cr \leq 2.0$, $0.005 \leq Mo \leq 0.5$, $0.005 \leq Nb \leq 0.3$, $0.005 \leq V \leq 0.3$, $0.005 \leq Ti \leq 0.3$ and $0.0001 \leq B \leq 0.01$, respectively.

Next, the components (units are all % by mass) of the weld metal will be described.

The components of the weld metal can be determined by measuring the emission spectroscopy by high frequency inductively coupled plasma (ICP) using the chips collected from the weld metal portion. Incidentally, with respect to collection of the chip, the region of the weld metal is preliminarily measured by observing the cross section of the welded portion, and from this region, the chip is collected by cutting it with a cutter, such as a drill. For this reason, the component of the weld metal is approximately the average value of the central portion of the weld metal, and the carbon equivalent is also an average value of the weld metal.

In welding, particularly in gas shielded arc welding, a trace amount of oxygen or nitrogen is incorporated into the molten metal from the atmosphere and shielding gas at the time of welding procedure. Therefore, unlike the steel plate base material, the weld metal contains oxides and nitrides. The oxides promote the ferrite transformation of the weld metal structure and cause a reduction in strength. Therefore, in the weld metal, it is necessary to increase C and Mn, which are the hardenability improving elements, more than those in the base material. On the other hand, nitrogen reacts with Al, Nb and V to form nitrides, which significantly hardens the weld metal and lowers the toughness value of the weld metal. Therefore, it is necessary to limit the upper limit value of those elements in the weld metal than in the base material.

From the above point of view, the components of the weld metal may be defined as follows.

C: 0.03% or More and 0.25% or Less

C is preferably in an amount of 0.03% or more in order to secure the strength of the joint. C forms an oxide, promotes ferrite transformation of the weld metal structure, and causes strength reduction. Therefore, in the weld metal, C, which is a hardenability improving element, is increased more than that in the base material. Further, in order to make the hardness distribution in the vicinity of the weld toe uniform, it is preferable to set it to 0.25% or less.

Si: 0.01% or More and 2.00% or Less

Si is useful for deoxidation and for securing strength, and is preferably in an amount of 0.01% or more. In addition, the addition of more than 2.00% impairs the weldability, so the content is preferably 2.00% or less.

Mn: 0.5% or More and 3.0% or Less

Mn is useful as an element to increase the strength at a low cost, and is preferably in an amount of 0.5% or more to secure the strength. Mn forms an oxide, promotes ferrite transformation of the weld metal structure, and causes strength reduction. Therefore, Mn, which is a hardenability improving element, is increased in the weld metal more than in the base material. In addition, the addition of more than 3.0% impairs the weldability, so the content is preferably 3.0% or less.

Al: 0.001% or More and 0.15% or Less

It is preferable to make the amount of Al 0.001% or more for deoxidation. It also reacts with nitrogen, if added in an amount of more than 0.15%, to form nitrides and significantly harden the weld metal and reduce the toughness value of the weld metal. Therefore, it is preferable to make it 0.15% or less, and thus, the upper limit value of Al in the weld metal is more restricted than in the base material.

Balance: Fe and Impurities

The balance is Fe and impurities. Here, the impurity is regarded as a component other than the element described above and an optional element described later. The impurities include Cu and Zn. The weld metal comprises the components of the welding wire and the base material. The surface of the welding wire may be plated with Cu or the like to ensure conductivity, and if the base metal is also plated in such a case, the plating component is contained in the weld metal, and Cu and Zn are also regarded as impurities.

Optional Elements: Ni, Cr, Mo, Nb, V, Ti and B

Ni, Cr, Mo, Nb, V, Ti, and B are all components that improve joint fatigue characteristics, and are considered to improve the fatigue strength against a force affected by the weld metal and the heat affected zone (HAZ). In this respect, these components are active components, and the fillet welded joint of the present embodiment can contain at least one of these components. However, any excess addition degrades the steel plate material. Therefore, it is preferable to contain in the range of $0.1 \leq Ni \leq 3.0$, $0.1 \leq Cr \leq 2.0$, $0.005 \leq Mo \leq 0.5$, $0.005 \leq Nb \leq 0.1$, $0.005 \leq V \leq 0.15$, $0.005 \leq Ti \leq 0.15$ and $0.0001 \leq B \leq 0.01$, respectively. Incidentally, Nb and Ti react with nitrogen to form nitrides, significantly harden the weld metal, and lower the toughness value of the weld metal. Therefore, the upper limit value of those elements in the weld metal is more restricted than in the base material.

Furthermore, in the fillet welded joint of the above configuration, the plate thickness of the base material can be set to 1.0 mm or more and 3.6 mm or less. By setting the plate thickness of the above base material to 1.0 mm or more, the base material is not excessively melted and thus welding defects such as burn-through defects are prevented at any location in the longitudinal direction of the fillet welded joint base material.

On the other hand, by setting the plate thickness of the base material to 3.6 mm or less, deformation of the steel plate in the out-of-plane direction becomes easy, and tensile residual stress in the welded portion, which becomes a problem in welding thick steel plate, can be reduced.

In addition, it is preferable to set the plate thickness of the base material to 1.8 mm or more and 2.6 mm or less, since the above effects are achieved at higher levels, respectively.

Furthermore, in the fillet welded joint of the above-described configuration, the Vickers hardness HVwmr of the weld metal on the weld root point side defined below may satisfy the following relationship.

$HVwmr \leq 350$

Point E in FIG. 1 is a so-called weld root point. The Vickers hardness HVwmr of the weld root portion is an average value of Vickers hardness of the weld metal in region F, which is 0.1 mm or more and 0.3 mm or less from the boundary between the weld metal on the weld root point side and the heat-affected zone (the boundary between the weld metal and the heat-affected zone located below the weld root point) to said weld metal side, which is in a cross section perpendicular to the welding line of the fillet welded joint and is on a straight line parallel to the surface of the base material, passing a position of 0.1 mm or more and 0.3 mm or less from weld root point E in the plate thickness direction of the base material. This average value is an average value of the hardness in at least arbitrary three points in region F.

Generally, in arc welding of thin steel plates, welding is performed at high speed, and the welding wire component and the base material component solidify without being sufficiently mixed. Therefore, unevenness in the components in the weld metal occurs. As a result, in the weld metal in the vicinity of toe portion A, the mixing ratio of the base material components becomes high, while the mixing ratio of the base material components in region F in the vicinity of root point E tends to be small.

In the present application, the carbon equivalent of the weld metal component is higher than that of the base material component for the purpose of improving the weld fatigue strength. Therefore, the weld metal in the vicinity of the root point (region F) tend to have higher weld metal hardness than the weld metal in the vicinity of toe portion A. For this reason, in order to prevent a low temperature cracking at the root portion, the weld metal hardness in the vicinity of the root point (region F) is preferably set to be Vickers hardness of 350 or less (HVwmr≤350) as an average value of three arbitrary points.

Incidentally, the numerical value of Vickers hardness of 350 is known as an index for prevention of low temperature cracking in welding of thick steel plate, and at the same time, it also matches the value obtained in the low temperature cracking examination in the lap fillet joint of thin steel plates conducted by the present inventors. That is, by setting the Vickers hardness of the weld metal at the weld root point side to 350 or less, the effect of suppressing low temperature cracking is improved.

<Method of Manufacturing Fillet Welded Joint>

Next, the manufacturing method of the fillet welded joint of the present embodiment is explained in full detail.

In the method of manufacturing a fillet welded joint according to the present embodiment, a part of two sheets of base material having a predetermined range of tensile strength and carbon equivalent are overlapped to each other and welding is performed by using a welding wire having a predetermined carbon equivalent at a predetermined welding speed. It is a method of manufacturing a fillet welded joint by performing fillet welding, wherein the tensile strength of the base material is 980 MPa or more, the carbon equivalent of the base material is 0.36 or more to 0.60 or less, and the tensile strength of the base material [MPa] is set to be 1950 times or more of the carbon equivalent [wt %] of the base material, as described above. The resulting fillet welded joint comprises the base material, the weld metal and the heat affected zone.

Specifically, in the method of manufacturing a fillet welded joint of the present embodiment, as a welding wire, one having a carbon equivalent of 0.50 or more and 0.80 or less and higher than the carbon equivalent of the base material is used. By setting the carbon equivalent of the welding wire to 0.50 or more, the softening of the weld metal can be prevented. By setting it to 0.80 or less, excessive hardening of the weld metal is suppressed, and hydrogen embrittlement of the weld metal can be prevented. Moreover, it is preferable that such a carbon equivalent is in the range of 0.55 or more and 0.70 or less, since the above effects are shown at higher levels, respectively.

Incidentally, in the manufacturing method of the fillet welded joint of the present embodiment, the carbon equivalent of the above-mentioned welding wire is set higher than the carbon equivalent (0.36 or more and 0.60 or less) of the above-mentioned base material. This is because the alloying component of the welding wire is oxidized and consumed at the time of welding, and the oxide inclusions in the weld metal promote intragranular transformation of the weld metal to form a fine structure.

Moreover, in the manufacturing method of the fillet welded joint of the present embodiment, the welding speed is set to 60 cm/min or more and 150 cm/min or less. By setting the welding speed to 60 cm/min or more, the mixing unevenness of the base metal component and the welding wire component in the weld metal is remarkable in the vicinity of the toe portion obtained by high speed welding, and the fatigue strength improvement effect of the present invention can be easily exhibited. Incidentally, it is preferred that such a welding speed is in the range of 80 cm/min or more, since said effect is shown at a higher level. The welding speed is one of the factors that determine the manufacturing efficiency of the welded structure, and the higher the speed, the higher the efficiency. Therefore, the upper limit may not be specified for the welding speed, as long as the fatigue strength and the like are not affected. However, excessive speeding-up is not preferable from the viewpoint of the weld bead shape, such as intensifying the movement of the molten pool. Therefore, the welding speed is 150 cm/min or less. Preferably, the welding speed may be 120 cm/min or less.

Here, a welding method applicable to the method of manufacturing the welded joint of the present embodiment includes a gas shield welding method using a mixed gas of Ar and $CO_2$ or the like. In particular, by adopting pulse MAG welding, it is possible to obtain a uniform weld bead shape even in high-speed welding, and to effectively realize the effect of the present invention (improvement of welding fatigue strength while suppressing low temperature cracking).

When the tensile strength and carbon equivalent of the base material are selected as described above, the base material has a structure in which work hardening is added to martensite, but the heat-affected zone becomes an automatically tempered martensitic structure. As a result, an excessive increase in hardness can be suppressed.

On the other hand, the structure of the weld metal is a mixed structure of martensite, bainite and ferrite. In the weld metal, oxide inclusions formed at the time of welding serve as a starting point of ferrite transformation, and as a result of intragranular transformation being promoted, a relatively high-strength weld metal also exhibits a fine morphology.

In the fillet welded joint obtained by the manufacturing method of the present embodiment, by selecting the tensile strength of the base material, the carbon equivalent of the base material, and the carbon equivalent of the welding wire in this manner, the following relationship (Formulas (4) to equation (6)) is satisfied.

$$HVbond \leq HVwmt \tag{4}$$

$$HVbond \leq HVhaz-50 \tag{5}$$

$$HVhaz \leq 350 \tag{6}$$

Therefore, in the fillet welded joint obtained by the manufacturing method of the present embodiment, by satisfying the above formulas (4) to (6), a welded portion (including the weld metal and the heat-affected zone) having excellent fatigue strength can be realized.

Furthermore, in the fillet welded joint obtained by the manufacturing method of the present embodiment, the Vickers hardness HVwmr of the weld root portion can also satisfy the following relationship.
HVwmr≤350

As a result, the suppression effect of the low temperature cracking in the fillet welded joint is improved.

EXAMPLE

Example for demonstrating the effect of this invention is explained in full detail as follows.

Figure 4:
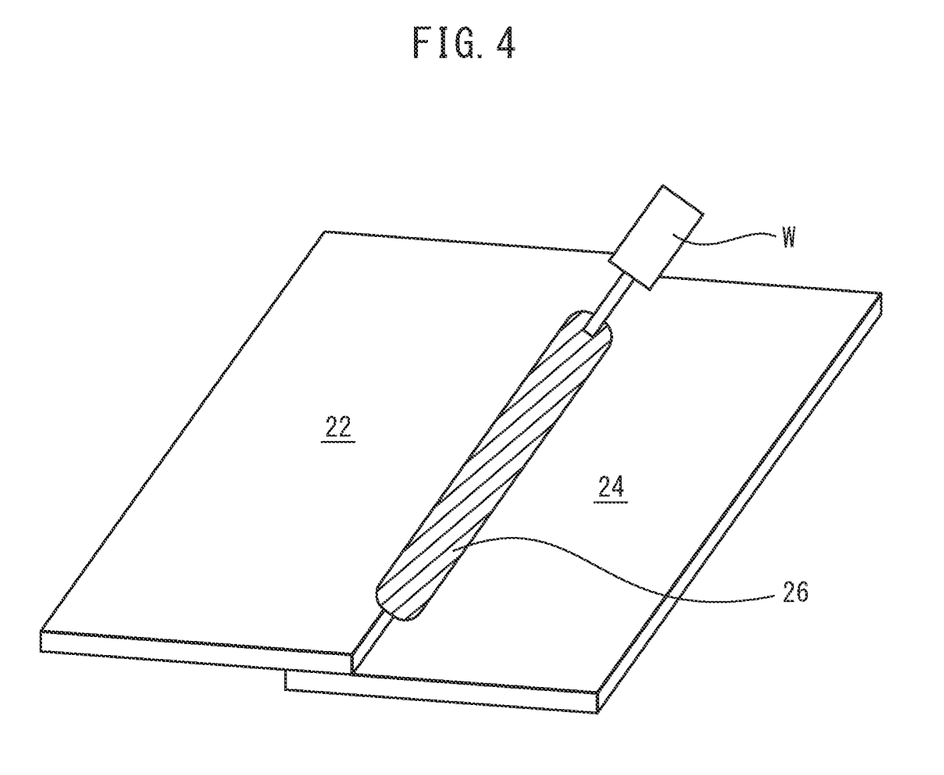
FIG. 4 is a view showing a welding method adopted in Examples.

FIG. 4 is a view showing a welding method adopted in the examples. As shown in the figure, a lap fillet welded joint was made using two thin plates (2.6 mm in thickness). Reference numeral 26 in FIG. 4 denotes a weld metal, and reference symbol W denotes a welder.

The welding conditions were pulse MAG welding with a current of 230 A and a voltage of 26 V, and the welding speed was 80 cm/min for all the cases.

Table 1 shows the components and carbon equivalents of steel materials (base materials) A to F used in the examples, and Table 2 shows the components and carbon equivalents of welding wires a-e used in the examples. Steel Materials B and C are outside the range of the present invention (0.36 or more and 0.60 or less) with respect to the carbon equivalent of steel materials, and welding wires a and d are outside the range of the present invention(0.5 or more and 0.80 or less) with respect to the carbon equivalent of welding wires

TABLE 1

| Steel Symbol | C | Si | Mn | Al | Ti | Cr | Mo | Nb | B | Ceq |
|---|---|---|---|---|---|---|---|---|---|---|
| A | 0.07 | 0.17 | 1.8 | 0.035 | 0.007 | 0.2 | — | 0.04 | — | 0.42 |
| B | 0.05 | 0.55 | 1.5 | 0.035 | 0.009 | — | — | 0.04 | — | 0.32 |
| C | 0.12 | 0.32 | 2.9 | 0.003 | — | — | — | — | — | 0.62 |
| D | 0.09 | 0.92 | 2.4 | 0.260 | — | — | 0.03 | — | — | 0.54 |
| E | 0.11 | 0.50 | 2.3 | 0.030 | — | — | — | — | — | 0.51 |
| F | 0.08 | 0.32 | 1.7 | 0.042 | 0.011 | — | — | 0.04 | 0.0015 | 0.38 |

Ceq(%)[JIS, WES] = C + Mn/6 + Si/24 + Ni/40 + Cr/5 + Mo/4 + V/14

TABLE 2

| Wire Symbol | C | Si | Mn | Al | Ti | Cu | Cr | Mo | Nb | B | Ni | Ceq |
|---|---|---|---|---|---|---|---|---|---|---|---|---|
| a | 0.07 | 0.70 | 1.4 | 0.023 | — | 0.31 | — | — | — | — | — | 0.33 |
| b | 0.12 | 0.70 | 2.3 | 0.028 | 0.050 | 0.32 | — | — | 0.2 | — | — | 0.53 |
| c | 0.08 | 0.70 | 1.6 | 0.031 | — | 0.29 | 0.7 | 0.4 | — | — | 2.3 | 0.67 |
| d | 0.11 | 0.70 | 2.1 | 0.033 | — | 0.29 | 1.1 | 0.4 | — | — | 2.3 | 0.87 |
| e | 0.12 | 0.50 | 2.5 | 0.033 | — | 0.25 | 0.7 | 0.2 | — | 0.003 | — | 0.75 |

Ceq(%)[JIS, WES] = C + Mn/6 + Si/24 + Ni/40 + Cr/5 + Mo/4 + V/14

Steel plates (base materials) of various strengths are manufactured with the components in Table 1, and then using the steel plates and the welding wires in Table 2, lap fillet welded joints of Comparative Examples 1 to 6 and Inventive Examples 1 to 8 shown in Table 3 were produced. Then, for each of these fillet welded joints, in a cross section perpendicular to the welding line of the fillet welded joint, on a straight line passing at 0.2 mm position in the thickness direction of the base material from the weld toe and is parallel to the base material surface, the Vickers hardness HVbond at the boundary between the weld metal and the heat-affected zone, and the average value of the Vickers hardness HVwmt of the weld metal in a position 0.2 mm from the boundary region to the weld metal side, and the average value of the Vickers hardness HVhaz of the heat affected zone in a position of 0.2 mm from the boundary to the heat-affected zone side were examined. In addition, the Vickers hardness HVwmr of the weld metal at the weld root point side was also investigated. These results are shown in Table 3. Incidentally, the fatigue test method was a plane bending fatigue test, and the case where the fatigue strength was over that of 780 MPa steel shown in Comparative Example 1 was judged as a pass for the determination of the fatigue strength. As for the determination of the static strength of the joint, since the strength of the hot stamp steel used in the prior art is reduced to about 60% of the base material strength, the strength of 60% or more was rated as "acceptable" and 70% or more was rated as "good."

TABLE 3

| | steel symbol | wire symbol | tensile strength of base material (MPa) | carbon equivalent of base material (%) | base material TS/ base material Ceq | carbon equivalent of welding wire (%) | Hvbond | HVwmt*1 | Hvhaz*2 |
|---|---|---|---|---|---|---|---|---|---|
| comparative example 1 | A | a | 780 | 0.42 | 1857 | 0.33 | 234 | 226 | 272 |
| comparative example 2 | B | c | 998 | 0.32 | 3119 | 0.67 | 227 | 249 | 218 |
| comparative example 3 | C | c | 980 | 0.62 | 1581 | 0.67 | 315 | 295 | 397 |
| comparative example 4 | F | a | 981 | 0.38 | 2582 | 0.33 | 225 | 214 | 258 |
| comparative example 5 | D | d | 995 | 0.54 | 1843 | 0.86 | 311 | 356 | 316 |
| comparative example 6 | D | b | 995 | 0.54 | 1843 | 0.53 | 272 | 254 | 334 |
| inventive example 1 | A | b | 995 | 0.42 | 2369 | 0.53 | 235 | 242 | 276 |
| inventive example 2 | A | c | 995 | 0.42 | 2369 | 0.67 | 238 | 254 | 270 |
| inventive example 3 | A | c | 1182 | 0.42 | 2814 | 0.67 | 234 | 267 | 278 |
| inventive example 4 | D | c | 1107 | 0.54 | 2050 | 0.67 | 267 | 271 | 304 |
| inventive example 5 | E | c | 998 | 0.51 | 1957 | 0.67 | 253 | 264 | 271 |
| inventive example 6 | F | c | 1120 | 0.38 | 2947 | 0.67 | 247 | 254 | 253 |
| inventive example 7 | A | e | 995 | 0.42 | 2369 | 0.75 | 255 | 283 | 273 |
| inventive example 8 | D | e | 1320 | 0.54 | 2444 | 0.75 | 278 | 312 | 304 |

| | difference between HVhaz and HVbond*3 | fatigue strength (MPa) | ratio of fatigue strength*4 | tensile strength of joint (%) | ratio of tensile strength to base material*5 | carbon equivalent of welded metal | HVwmr | low temperature cracking |
|---|---|---|---|---|---|---|---|---|
| comparative example 1 | −38 | 215 | reference | 741 | 0.95 | good | 0.36 | 243 | No |
| comparative example 2 | 9 | 205 | 0.95 | 650 | 0.65 | acceptable | 0.46 | 263 | No |
| comparative example 3 | −82 | 180 | 0.84 | 982 | 1.00 | good | 0.59 | 311 | No |
| comparative example 4 | −33 | 205 | 0.95 | 684 | 0.70 | acceptable | 0.33 | 228 | No |

TABLE 3-continued

| | | | | | | | | | |
|---|---|---|---|---|---|---|---|---|---|
| comparative example 5 | −5 | 250 | 1.16 | 781 | 0.78 | good | 0.68 | 384 | Yes |
| comparative example 6 | −62 | 200 | 0.93 | 825 | 0.83 | good | 0.51 | 281 | No |
| inventive example 1 | −41 | 250 | 1.16 | 810 | 0.81 | good | 0.45 | 254 | No |
| inventive example 2 | −32 | 260 | 1.21 | 819 | 0.82 | good | 0.50 | 276 | No |
| inventive example 3 | −44 | 255 | 1.19 | 821 | 0.69 | acceptable | 0.51 | 278 | No |
| inventive example 4 | −37 | 255 | 1.19 | 927 | 0.84 | good | 0.55 | 295 | No |
| inventive example 5 | −18 | 250 | 1.16 | 789 | 0.79 | good | 0.55 | 281 | No |
| inventive example 6 | −6 | 250 | 1.16 | 754 | 0.67 | acceptable | 0.49 | 269 | No |
| inventive example 7 | −18 | 285 | 1.33 | 813 | 0.82 | good | 0.54 | 291 | No |
| inventive example 8 | −26 | 285 | 1.33 | 957 | 0.73 | good | 0.62 | 323 | No |

\*1pass at above HVbond or more
\*2pass at 350 or less
\*3pass at 50 or less
\*4pass at 1 or more based on the fatigue strength of Comparative Example 1
\*5acceptable at 0.6 or more and good at 0.7 or more As is clear from Table 3, it was confirmed that all of Inventive Examples 1 to 8 satisfied the requirements: HVbond≤HVwmt, HVbond≤HVhaz≤50 and HVhaz≤350, on the premise that they have base material strength of 980 MPa or more, carbon equivalent of the base material of 0.36 to 0.60(%), (base material tensile strength/base material carbon equivalent) of 1950 or more, the carbon equivalent of the welding wire of 0.50 to 0.80 and higher than the carbon equivalent of the base material. It was confirmed that all of these Inventive Examples 1 to 8 had excellent fatigue strengths (fatigue strength ratio is 1.1 times or more of the fatigue strength of the 780 MPa steel shown in Comparative Example 1) without causing low temperature cracking.

In addition, it was also confirmed that in Inventive Examples 1, 2 and 4 to 7 in which (base material tensile strength/base material carbon equivalent)≤2750 or less, it is possible to suppress a decrease in the joint tensile strength due to HAZ softening.

On the other hand, in each of Comparative Examples 1 to 6, at least one of the tensile strength of the base material, the carbon equivalent of the base material, the relationship between the tensile strength and the carbon equivalent of the base material, the carbon equivalent of the welding wire, and the Vickers hardnesses were outside the predetermined range defined in the present invention. Therefore, it was confirmed that excellent results were not obtained for at least one of low temperature cracking, fatigue strength and static tensile strength. More specifically, in Comparative Example 1, the tensile strength of the base material, the relationship between the tensile strength and carbon equivalent of the base material, and the Vickers hardness (relational formula (1) HVbond≤HVwmt) were outside the predetermined range defined in the present invention, and thus the tensile strength was low, and the fatigue strength was 215 MPa.

In Comparative Example 2, the carbon equivalent of the base material was outside the predetermined range defined in the present invention. The fatigue strength was lower than Comparative Example 1 corresponding to the conventional product.

In Comparative Example 3, the carbon equivalent of the base material, the relationship between the tensile strength and the carbon equivalent of the base material, and the Vickers hardness (relational formulas (1) to (3)) were outside the predetermined range defined in the present invention. The fatigue strength was lower than Comparative Example 1 corresponding to the conventional product.

In Comparative Example 4, the carbon equivalent of the welding wire is less than the predetermined range defined in the present invention and the Vickers hardness (relational formula (1)) was outside the predetermined range defined in the present invention. The fatigue strength was lower than Comparative Example 1 corresponding to the conventional product.

In Comparative Example 5, the carbon equivalent of the welding wire was more than the predetermined range defined in the present invention, the relationship of Vickers hardness of the root portion, HVwmr≤350 was not satisfied, and thus low temperature cracking occurred.

In Comparative Example 6, the Vickers hardnesses (relational formulas (1) and (3)) was outside the predetermined range defined in the present invention, and the fatigue strength was lower than Comparative Example 1 corresponding to the prior art.

Therefore, in each of Comparative Examples, it cannot be said that excellent fatigue strength is realized while suppressing low temperature cracking in the welded portion (including the weld metal and the heat affected zone).

DESCRIPTION OF THE SYMBOLS

10 fillet welded joint
12, 14, 22, 24 base material
16, 26 weld metal
A weld toe
B representative point of boundary
C region in the weld metal in a position of 0.1 mm or more and 0.3 mm or less from representative point B to the weld metal 16 side
D region in the heat affected zone in a position of 0.1 mm or more and 0.3 mm or less from the boundary (representative point B) to the heat affected zone side
E weld root point
F region in the weld metal in a position of 0.1 mm or more and 0.3 mm or less from the boundary (the boundary between the weld metal and the heat-affected zone located below the weld root point E) to the weld metal side
S dimension between weld toe and imaginary line
W welding machine

The invention claimed is:
1. A fillet welded joint obtained by overlapping a part of two sheets of base material and performing fillet welding,
wherein the fillet welded joint comprises the base material, weld metal and heat-affected zone,
wherein the base material has a tensile strength of 980 MPa or more, a carbon equivalent of 0.36 or more and 0.60 or less, and the tensile strength [MPa] of 1950 times or more of the carbon equivalent [wt %] of the base material,
wherein the weld metal has an average carbon equivalent of 0.45 or more and 0.65 or less, and higher carbon equivalent of the base material,
wherein, in a cross section perpendicular to the welding line of the fillet welded joint, on a straight line parallel to the surface of the base material, passing a position of 0.1 mm or more and 0.3 mm or less from the weld toe in the plate thickness direction of the base material,
a Vickers hardness HVbond at a boundary between the weld metal and the heat affected zone and located below the weld toe, an average value HVwmt of the Vickers hardness of the weld metal in a position of 0.1 mm or more and 0.3 mm or less from the boundary to the weld metal side, and an average value HVhaz of the Vickers hardness of the heat affected zone in a position of 0.1 mm or more and 0.3 mm or less from the boundary to the heat affected zone side satisfy the following relationship,
(1) HVbond≤HVwmt
(2) HVbond≥HVhaz-50 and
(3) HVhaz≤350.
2. The fillet welded joint according to claim 1, wherein the tensile strength of the base material is 2750 times or less of the carbon equivalent of the base material.
3. The fillet welded joint according to claim 1, wherein the base material comprises 0.01≤C≤0.25, 0.01≤Si≤2.00, 0.05≤Mn≤3.0, and 0.001≤Al≤0.4 on the basis of mass %, the balance being Fe and impurities.
4. The fillet welded joint according to claim 3, wherein the base material further comprises at least one of 0.1≤Ni≤3.0, 0.1≤Cr≤2.0, 0.005≤Mo≤0.5, 0.005≤Nb≤0.3, 0.005≤V≤0.3, 0.005≤Ti≤0.3, and 0.0001≤B≤0.01 on the basis of mass %.
5. The fillet welded joint according to claim 1, wherein the weld metal comprises 0.03≤C≤0.25, 0.01≤Si≤2.00, 0.5≤Mn≤3.0, and 0.001≤Al≤0.15 on the basis of mass %, the balance being Fe and impurities.
6. The fillet welded joint according to claim 5, wherein the weld metal further comprises at least one of 0.1≤Ni≤3.0, 0.1≤Cr≤2.0, 0.005≤Mo≤0.5, 0.005≤Nb≤0.1, 0.005≤V≤0.15, 0.005≤Ti≤0.15, and 0.0001≤B≤0.01 on the basis of mass %.
7. The fillet welded joint according to claim 1, wherein base material has plate thickness of 1.0 mm or more and 3.6 mm or less.
8. The fillet welded joint according to claim 1, wherein in a cross section perpendicular to the welding line of the fillet welded joint, on a straight line parallel to the surface of the base material, passing a position of 0.1 mm or more and 0.3 mm or less from the weld root point in the plate thickness direction of the base material,
an average value HVwmr of the Vickers hardness of the weld metal in the region of 0.1 mm or more and 0.3 mm or less from the boundary between the weld metal and the heat affected zone located below the weld root point to the weld metal side satisfies the following relationship:
HVwmr≤350.
9. A method of preparing the fillet welded joint according to claim 1, comprising overlapping a part of two sheets of base material and performing fillet welding by using a welding wire,
wherein the base material has a tensile strength of 980 Mpa or more, a carbon equivalent of 0.36 or more and 0.60 or less, and the tensile strength [MPa] of 1950 times or more of the carbon equivalent [wt %] of the base material,
wherein the welding wire has a carbon equivalent of 0.50 or more and 0.80 or less, and higher carbon equivalent of the base material,
wherein welding speed is 60 cm/min or more and 150 cm/min or less.
10. The fillet welded joint according to claim 2, wherein the base material comprises 0.01≤C≤0.25, 0.01≤Si≤2.00, 0.05≤Mn≤3.0, and 0.001≤Al≤0.4 on the basis of mass %, the balance being Fe and impurities.
11. The fillet welded joint according to claim 2, wherein the weld metal comprises 0.03≤C≤0.25, 0.01≤Si≤2.00, 0.5≤Mn≤3.0, and 0.001≤Al≤0.15 on the basis of mass %, the balance being Fe and impurities.
12. The fillet welded joint according to claim 3, wherein the weld metal comprises 0.03≤C≤0.25, 0.01≤Si≤2.00, 0.5≤Mn≤3.0, and 0.001≤Al≤0.15 on the basis of mass %, the balance being Fe and impurities.
13. The fillet welded joint according to claim 4, wherein the weld metal comprises 0.03≤C≤0.25, 0.01≤Si≤2.00, 0.5≤Mn≤3.0, and 0.001≤Al≤0.15 on the basis of mass %, the balance being Fe and impurities.
14. The fillet welded joint according to claim 2, wherein the base material has plate thickness of 1.0 mm or more and 3.6 mm or less.
15. The fillet welded joint according to claim 3, wherein the base material has plate thickness of 1.0 mm or more and 3.6 mm or less.
16. The fillet welded joint according to claim 4, wherein the base material has plate thickness of 1.0 mm or more and 3.6 mm or less.
17. The fillet welded joint according to claim 5, wherein the base material has plate thickness of 1.0 mm or more and 3.6 mm or less.
18. The fillet welded joint according to claim 6, wherein the base material has plate thickness of 1.0 mm or more and 3.6 mm or less.
19. The fillet welded joint according to claim 2, wherein in a cross section perpendicular to the welding line of the fillet welded joint, on a straight line parallel to the surface of the base material, passing a position of 0.1 mm or more and 0.3 mm or less from the weld root point in the plate thickness direction of the base material,
an average value HVwmr of the Vickers hardness of the weld metal in the region of 0.1 mm or more and 0.3 mm or less from the boundary between the weld metal and the heat affected zone located below the weld root point to the weld metal side satisfies the following relationship:
HVwmr≤350.
20. The fillet welded joint according to claim 3, wherein in a cross section perpendicular to the welding line of the fillet welded joint, on a straight line parallel to the surface of the base material, passing a position of 0.1 mm or more and

0.3 mm or less from the weld root point in the plate thickness direction of the base material, an average value HVwmr of the Vickers hardness of the weld metal in the region of 0.1 mm or more and 0.3 mm or less from the boundary between the weld metal and the heat affected zone located below the weld root point to the weld metal side satisfies the following relationship:

HVwmr≤350.

* * * * *

UNITED STATES PATENT AND TRADEMARK OFFICE
CERTIFICATE OF CORRECTION

PATENT NO. : 11,235,415 B2
APPLICATION NO. : 16/489144
DATED : February 1, 2022
INVENTOR(S) : Shinji Kodama et al.

Page 1 of 1

It is certified that error appears in the above-identified patent and that said Letters Patent is hereby corrected as shown below:

In the Specification

Column 17, Line 27:
Change "$HVbond \leq HVhaz \leq 50$" to --$HVbond \geq HVhaz-50$--.

Signed and Sealed this
Eighteenth Day of October, 2022

Katherine Kelly Vidal
*Director of the United States Patent and Trademark Office*